United States Patent
Kang et al.

(10) Patent No.: US 7,178,022 B2
(45) Date of Patent: *Feb. 13, 2007

(54) DIGITAL CONTENT CRYPTOGRAPH AND PROCESS

(75) Inventors: En-Seung Kang, Seoul (KR); Jin-Young Byun, Seoul (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/857,911

(22) Filed: Jun. 2, 2004

(65) Prior Publication Data

US 2004/0225891 A1   Nov. 11, 2004

Related U.S. Application Data

(63) Continuation of application No. 09/217,932, filed on Dec. 22, 1998, now Pat. No. 6,892,306.

(30) Foreign Application Priority Data

Sep. 24, 1998 (KR) ................................. 98-39808
Sep. 24, 1998 (KR) ................................. 98-39809

(51) Int. Cl.
*H04L 9/00* (2006.01)
*G06F 11/30* (2006.01)
*H04N 7/167* (2006.01)

(52) U.S. Cl. ..................... 713/160; 713/167; 713/193; 380/201; 380/277

(58) Field of Classification Search ................. 713/160, 713/167, 170, 181, 193; 380/201, 202
See application file for complete search history.

(56) References Cited

U.S. PATENT DOCUMENTS 5,276,735 A * 1/1994 Boebert et al. ............. 713/167

(Continued)

FOREIGN PATENT DOCUMENTS

EP            0 739 106 A1      10/1996

(Continued)

OTHER PUBLICATIONS

Matyas, "Key handling with control vectors", IBM Systems Journal vol. 30, No. 2, pp. 151-174, 1991.

(Continued)

*Primary Examiner*—Kambiz Zand
(74) *Attorney, Agent, or Firm*—Robert E. Bushnell, Esq.

(57) ABSTRACT

A digital cryptograph and encryption process encrypts and transmits in a digital format specific items of information requested by a user of a digital content transmission system by using key information, a user's key and a temporary validation key, to decrypt and replay the encrypted digital information at the user's terminal by using the key information and the user's authorization information. Each registered subscribing user is provided with unique key information. The user key is generated by applying the key information to a key generation algorithm. The temporary validation key that is created when the registered user accesses the server, is encrypted with the user key. The digital information is encrypted by using the temporary validation key in an encryption algorithm. The decryption algorithm allows the user to decrypt and replay the encrypted digital information upon receipt of the key information that has a one-to-one correspondence to the identity characters of the registered subscribing user.

4 Claims, 17 Drawing Sheets

U.S. PATENT DOCUMENTS

| | | | |
|---|---|---|---|
| 5,495,533 | A | 2/1996 | Linehan et al. |
| 5,638,443 | A | 6/1997 | Stefik et al. |
| 5,812,668 | A | 9/1998 | Weber |
| 5,910,987 | A | 6/1999 | Ginter et al. |
| 6,105,134 | A | 8/2000 | Pinder et al. |
| 6,381,331 | B1 | 4/2002 | Kato |
| 6,424,714 | B1 | 7/2002 | Wasilewski |
| 6,438,612 | B1 | 8/2002 | Ylonen et al. |

FOREIGN PATENT DOCUMENTS

| | | |
|---|---|---|
| EP | 0 843 449 | 5/1998 |
| EP | 0 843 449 A2 | 5/1998 |

OTHER PUBLICATIONS

Qiao et al., "Comparison of MPEG Encryption Algorithms", Comput. & Graphics. vol. 22, No. 4, pp. 437-448, 1998.

*Search Report* from the European Patent Office issued in Applicant's corresponding European Patent Application No. 06076081.6-2413 dated Jul. 13, 2006.

*Office Action* from the Patent Office of the People's Republic of China issued in Applicant's corresponding Korean Patent Application Nos. 1998-39808 and 1998-39809 dated Sep. 9, 2005.

\* cited by examiner

FIG. 13

| COPYRIGHT SUPPORT INFORMATION | OFFSET | SIZE OF UNENCRYPTED HEADER | UNENCRYPTED HEADER | SIZE OF ENCRYPTED HEADER | ENCRYPTED HEADER | ADDITIONAL INFORMATION |
|---|---|---|---|---|---|---|

FIG. 14

| COPYRIGHT LIBRARY VERSION | INFORMATION ON DIGITAL CONTENT CONVERSION FORMAT | KEY GENERATION ALGORITHM | DIGITAL CONTENT ENCRYPTION ALGORITHM | USER AUTHORIZATION INFORMATION AT PC | USER AUTHORIZTION INFORMATION AT REPLAYING DEVICE |
|---|---|---|---|---|---|

FIG. 15

| COPYRIGHT LIBRARY VERSION | DIGITAL CONTENT CONVERSION FORMAT | DIGITAL CONTENT PROVIDER CODE | KEY GENERATION ALGORITHM | DIGITAL CONTENT ENCRYPTION ALGORITHM | NUMBER OF USERS SHARING PC | NUMBER OF USERS SHARING REPLAYING DEVICE | USER AUTHORIZATION INFORMATION AT PC | USER AUTHORIZTION INFORMATION AT REPLAYING DEVICE |
|---|---|---|---|---|---|---|---|---|

FIG. 16

| SIZE OF HASH VALUE | HASH VALUE | SIZE OF RESULTANT VALUE OF ENCRYPTED TEMPORARY VALIDATION KEY | RESULTANT VALUE OF ENCRYPTED TEMPORARY VALIDATION KEY |
|---|---|---|---|

FIG. 17

| BASIC PROCESS UNIT OF DIGITAL CONTENT | ENCRYPTION SIZE | ENCRYPTED FRAME UNIT | HASH VALUE FOR DETERMINING THE STATE OF HEADER |
|---|---|---|---|

DIGITAL CONTENT CRYPTOGRAPH AND PROCESS

CLAIM OF PRIORITY AND CROSS-REFERENCE TO RELATED APPLICATIONS

This application makes reference to, incorporates the same herein, and claims all rights accruing thereto under 35 U.S.C. §119 through our patent applications entitled The Digital Content Encryption Apparatus And Method Thereof earlier filed on the 24 day of Sep. 1998 in the Korean Industrial Property Office and there duly assigned Serial Nos. 1998/39808 and 1998/39809. Further, This application is a continuation of Applicant's Ser. No. 09/217,932 filed in the U.S. Patent & Trademark Office on 22 Dec. 1998 now U.S. Pat. No. 6,892,306, and assigned to the assignee of the present invention.

FIELD OF THE INVENTION

The present invention is generally related to encryption processes and apparatus, and, more particularly, to processes and apparatus for the generation and use of keys in the transmission and replay of digital information.

BACKGROUND ART

Recently, with the flood of information provided by various media such as broadcasting and press, an atmosphere has been created by the information providers who are interested in providing integrated information that covers all of the media. Other users want to selectively receive a specific item of digital information from the entire spectrum of information available from a particular information provider (IP). Accordingly, a digital content transmission system has been formed by the information providers who convert various types of information into digital form and store this digital information, and the users subscribe to this digital information system from the information provider via the network. Digital information transmission systems endow an application program with easy downloadability of the digital content. The user can get all the information desired by using this application program to access the digital information system through the network.

The digital information may be provided to the user either for pay or for free. In case of paid digital information, the server who provides the digital information via the transmission system sets the service fee. The service server charges the user according to the quantity of information used when the digital information is downloaded to the user.

MPEG software protocol for example, compresses audio files to a fraction of their original size, but has little perceptible affect upon the quality of the audio sound. MPEG software protocol is now widely used by Internet sites offering digitalized music, and is reported to be commonly used to offer digitalized versions of recorded music without the consent of the musicians. When a user is connected to a server that provides digital information commercially via a network, a few of the users may be able to inadvertently or illegally copy the digital information, a practice that would be economically damaging to both the musicians and to the server who is running the digital information transmission system.

Currently, the server, as well as the musicians, can do little more than seek redress by undertaking civil and criminal action in an effort to control the possibility of unlicenced reception of digital information. We have noticed that there is a need for a technique to preserve transmission security of revenue bearing information while restricting access to the information by unauthorized entities and preventing unauthorized users from using any of the information that they may be able to illicitly obtain from the information provider by restricting the ability of the unauthorized users to decrypting whatever information they manage to obtain via the system.

SUMMARY OF THE INVENTION

It is therefore, one object of the present invention to provide improvements in cryptographic processes and apparatus.

It is another object to provide digital encryption processes and apparatus able to encrypt and transmit digital information received from a transmission system, by the use of multiple cryptographic keys.

It is still another object to provide digital encryption processes and apparatus for generating and using multiple cryptographic keys during the transmission of digital information to a user.

It is yet another object to provide digital encryption processes and apparatus that employ user information in the generation and use of multiple cryptographic keys during the transmission of digital information to the user.

It is still yet another object to provide digital encryption processes and apparatus able to encrypt and transmit digital information obtained from a transmission system by using multiple cryptographic keys, and to decrypt and play the digital information at the terminal of the user by using a plurality of keys, one of which is common to the multiple keys.

It is a further object to provide digital encryption processes and apparatus able to encrypt and transmit digital information obtained from a transmission system by using key information, a user's key, and a temporary validation key, and to decrypt and play the digital information at the terminal of the user by using the key information and user authorization information.

It is a still further object to provide encryption, transmission and reception protocols enabling encryption, transmission and decryption of digital information received from a transmission system.

It is a yet further object to provide encryption, transmission and reception protocols enabling encryption and transmission of digital information received from a transmission system by using multiple keys to encrypt the digital information, and decryption and replay of the digital information at the terminal of the user by using a plurality of keys, one of which is common to the multiple keys.

It is a still yet further object to provide encryption, transmission and reception protocols enabling encryption and transmission of digital information received from a transmission system, by using key information, a user's key, and a temporary validation key, and decryption and replay of the digital information at the terminal of the user by using the key information and user authorization information.

It is also an object to provide a more secure cryptograph and process for transmitting information to a terminal of a user who has requested the information.

It is also a further object to provide a cryptograph and process that reliably restricts the ability of a registered subscriber who has validly obtained information from an information provider, to deliver that information to another entity in a readily usable form.

These and other objects may be attained with an encryption process and apparatus that enables a user to request transmission of items of digital information to the user's terminal unit; prior to transmission of the items requested however, the user must register membership information that includes the user's identity characters, with the server that controls the transmission of the digital information. The server generates encryption key information in correspondence with the user's identity characters that have been received from the terminal unit. The server furnishes, and the terminal unit downloads and stores the encryption key information that is received by the terminal unit in response to the request by a user for the digital information from the server. The server encrypts the digital information with the encryption key information and the terminal unit decrypts the digital information received from the server by using a decryption algorithm in conjunction with the encryption information, and replays the decrypted information.

One embodiment of the present invention contemplates a protocol format to maintain the copyright protection of the digital information, with a header field and an encrypted digital information field. The server uses a cryptograph with a protocol format generator that furnishes the copyright protection protocol format and a user's key for encrypting a temporary validation key using a key generation algorithm, together with the encryption key information that corresponds to the identity characters of the user. The protocol format generator provides a header for the protection protocol format by using the user's key to generate a temporary validation key. The protocol format generator adds to the header encrypted digital information that has been encrypted with the use of the temporary validation key in order to form the copyright protection protocol format. The terminal unit uses the key information and a decryption algorithm to decrypt the user's key and the temporary validation key, and decrypts the copyright protection protocol format by using the temporary validation key.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 13 is an illustration of another embodiment of a header field that may be applied to the protocol formats shown in FIG. 10 and in FIG. 11;

FIG. 14 is an illustration of an unencrypted header field suitable for the header fields shown in FIG. 12 and in FIG. 13;

FIG. 15 illustrates another embodiment of an unencrypted header field suitable for use as the header fields in FIG. 12 and in FIG. 13;

FIG. 16 illustrates a format of user authorization information suitable for application to the unencrypted header field shown in FIGS. 14 and 15;

FIG. 17 illustrates the details of a header field as may be used in the header fields shown in FIGS. 12 and 13;

DETAILED DESCRIPTION OF PREFERRED EMBODIMENTS

Figure 1:
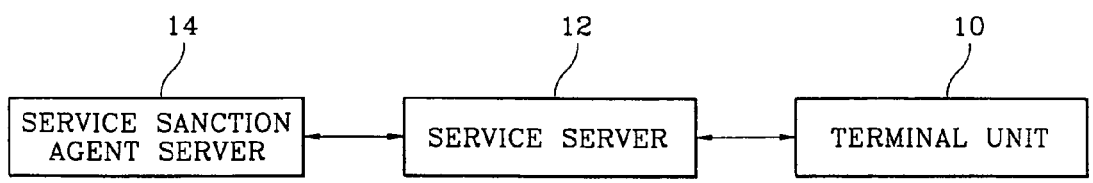
FIG. 1 is a schematic block diagram illustrating one embodiment of a digital content encryption/decryption apparatus constructed according to the principles of the present invention.

Embodiments of the present invention contemplate the use of three keys in order to encrypt and decrypt digital information such as audio material like recorded music, and audio and video material. Practice of embodiments of the present invention may use three keys in order to encrypt and decrypt the digital information.

The first of these keys is key information that is generated in the host server in response to the request of the service server when the user to be provided with the digital information is found to be unregistered with the host server. The key information that is then generated is stored in the user's terminal unit after being received by the terminal unit from the service server. If a particular digital content transmission system combines the host server and the service server, the key information can also be generated by the service server. The key information is used to generate a temporary validation key in the decryption process as well as in the encryption process. Also, the key information is used to ascertain whether the user is authorized to download and replay the encrypted digital information in the user's terminal unit. The key information is preferably generated by using random numbers and makes a one-to-one correspondence that may be unique to the user. Once generated, the key information is stored in the database of the host server with the user's characteristic characters. The size of the key information is preferably one hundred and twenty-eight 128 bytes.

A second of these keys is a user's key that is used for encrypting and decrypting the temporary validation key in the user authorization information of a header. The user's key is generated by applying the key information to a key generation algorithm, and the user's key is used for generating and confirming the user's authorization information. The user's authorization information indicates a hash value for the user key that is generated by using the key information. When the hash value of the user's key that is generated from the key information for the user is determined to be the same as the hash value in the user's authorization information found in the header, the user is considered to be authorized to replay the encrypted digital information.

In summary, the user's key is generated by using the key information, and used to encrypt the temporary validation key included among the user's authorization information that is placed in the header. The user's key is also used by the user to decrypt the encrypted temporary validation key, which is used to decrypt the encrypted digital information. The hash has the advantageous feature of always providing the same output from the same input without ever permitting the input to be inferred from the output.

Third, a temporary validation key is used for encrypting a part of the digital information and the header. It is preferably generated by using random numbers and its size is determined to be a multiple of eight (8) bytes. In the practice of the present invention, the temporary validation key is preferably eight (8) bytes. One feature of the present invention is that two temporary validation keys with the same content will not be generated. For example, the temporary validation key may be generated according to the time when the user accesses the service server. Accordingly, the same user will receive different temporary validation keys, with each of the temporary validation keys corresponding to a different access time of the user. The temporary validation keys remain valid only while the user is in the process of accessing the system, that is, temporarily.

In addition to algorithms for encrypting revenue bearing information supplied by the information provider, and algorithms enabling an authorized user to decrypt the information obtained from the information provider via the system, the present invention contemplates the use of a plurality of other algorithms; these algorithms include a key generation algorithm, a digital content encryption and decryption algorithm, and a hash algorithm.

The first of these algorithms, the key generation algorithm, generates the user's key by using the key information from the host server. In those systems where the host server is separate from service server, the key generation algorithm is included in the service server.

The second algorithm, the digital content encryption and decryption algorithm, is also included in the service server and is used by the service server to generate the header information to encrypt the digital information that has been requested by the user.

The third algorithm, the hash algorithm, is used to generate the user's authorization information by using the user's key in the service server, and is used to make a determination about whether the user is authorized to receive the digital information that the user has requested from the information provider via the system.

The digital information that is requested by the user is sometimes referred to in this specification as digital content. Briefly, the digital information is some sort of data such as music or a literary composition, that has been converted into digital signals that are stored in the form of a single file. The user may select the digital information that has been stored in the form of a file through the network, and then access and read or listen to the digital information by using a personal or laptop computer with the aid of an application program for network communication and a device such as compact disk drive or a DVD that is either incorporated into the computer or is connected as a peripheral accessory to the computer, for replaying the digital information. The digital information includes all of the information that has been converted into the digital data by the information provider and stored in the form of file, such as a magazine, a book, a dictionary and a drawing or illustration, as well as a song.

Figure 2:
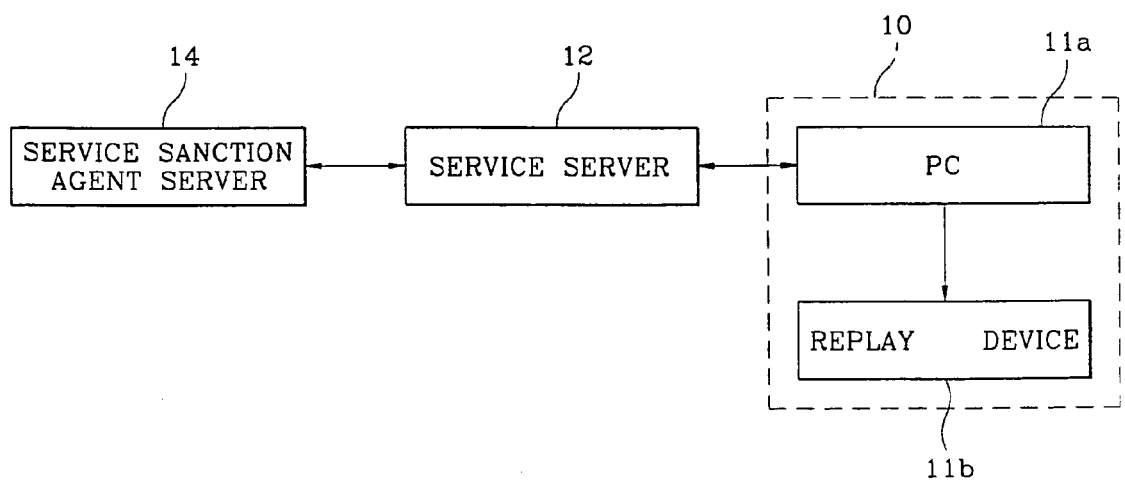
FIG. 2 is a schematic block diagram illustrating one embodiment of the terminal unit shown in FIG. 1.

FIGS. 1 and 2 are schematic block diagrams showing one embodiment of the digital content encryption and decryption apparatus constructed according to the principles of the present invention. Terminal unit 10 transmits the user's identity characters and receives and stores the key information that is generated by service server 12 in correspondence with the identity characters furnished by the user's terminal unit 10. The key information is received from service server 12 along with the protocol and the encrypted digital information requested by the user. Terminal unit 10 decrypts and replays the digital information by using the stored key information and the decryption algorithm.

Service server 12 generates the header with the user's authorization information including the temporary validation key that has been encrypted with the user's key. Service server 12 then adds the encrypted digital information to the header in order to generate the protocol for copyright protection. The protocol for copyright protection is transmitted to the user's terminal unit 10 through the network.

As illustrated by FIG. 2, terminal unit 10 may be constructed with a personal computer PC 11a equipped with the conventional communication device and a peripheral or internal device 11b for replaying the digital information. Computer 11a and replay device 11b may be provided with a plurality of decryption algorithms. Terminal unit 10 may be a personal computer (PC) or a laptop computer 11a connected to the Internet. Generally, terminal unit 10 may be any kind of apparatus equipped with a communication program and communication device that enables connection with the Internet. Examples of communication devices that may be incorporated into computer 11a of terminal unit 10 are digital televisions, cellular telephones and web videophones. For example, when computer 11a is equipped with a network access program, terminal unit 10 may be connected to either a public switched telephone network or a wireless network.

Computer PC 11a receives the key information from service server 12 and stores the key information. Computer PC 11a also receives the protocol that includes the encrypted digital information and stores the digital information in a long-term storage medium such as a hard disk (e.g., a HDD (hard disk drive)). Computer 11a also generates the user's key by using the stored key information, decrypts the temporary validation key by using the generated user's key, and decrypts the encrypted digital information by using the encrypted temporary validation key. As a result, the decrypted digital information may be replayed through either a video display or an audio device of computer 11a independently of any other internal or peripheral replaying device 11b.

Replay device 11b receives the key information and the encrypted digital content from the PC 11a and decrypts the encrypted digital content by using the stored decryption algorithm. Replay device 11b may be either portable or stationary, depending upon the type of its storage media.

Service server 12 generates key information that is based upon the identity characters of the user that have been transmitted from terminal unit 10, stores the key information with the identity characters, and transmits the key information to computer 11a of terminal unit 10 when the user requests the key information. Service server 12 generates the temporary validation key in response to the user's request, uses the key information to generate the user's key, and generates the user's authorization information from the temporary validation key encrypted by using the user's key and the hash value of the user's key. Service server 12 also adds the digital information that has been encrypted by the encryption algorithm, to the header containing the user's authorization information in order to form the copyright protection protocol, and then transmits the copyright protection protocol to terminal unit 10.

Service sanction agent server 14 of FIGS. 1 and 2 receives a signal from service server 12 related to the digital information fees for downloading the digital content from service server 12, and charges the user by accumulating these fees for the registered user.

Preferred identity characters that define the user may be the user's social security number, the user's driver license number or the user's resident registration number, but any set of characters may be used that tend to uniquely identify the user in the manner of the driver's license number.

Figure 3:
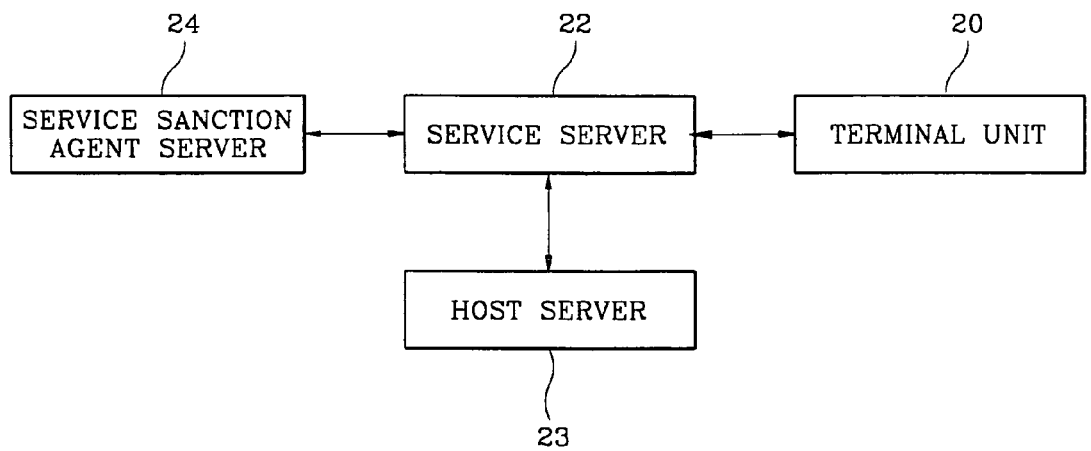
FIG. 3 is a schematic block diagram illustrating another embodiment of the digital content encryption apparatus shown in FIG. 1.
Figure 4:
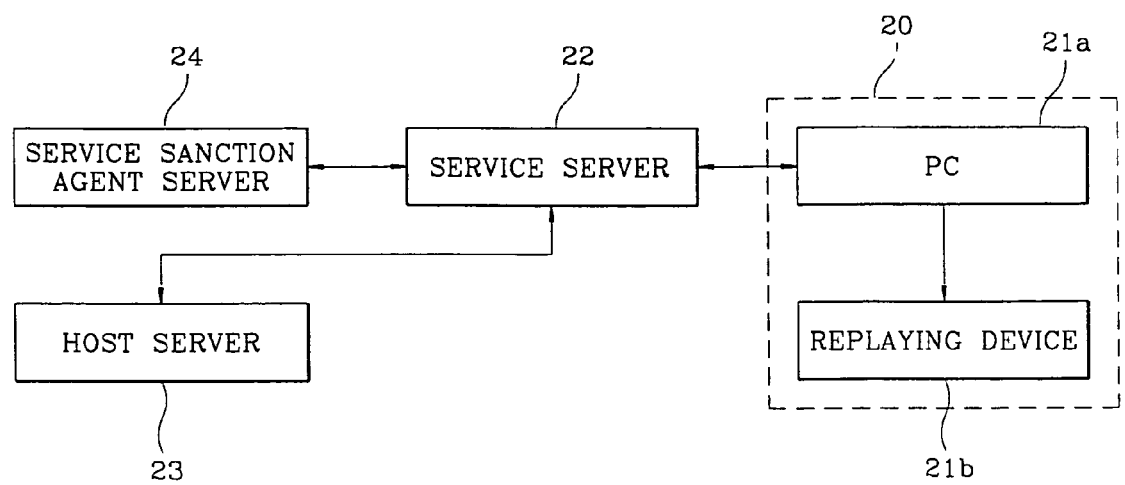
FIG. 4 is a schematic block diagram illustrating another embodiment of the terminal unit shown in FIG. 1.

FIGS. 3 and 4 are schematic block diagrams showing another embodiment suitable for the practice of the present invention. The explanation related to terminal unit 20, computer 22a, replaying device 21b and service sanction agent server 24 will be omitted because these components were described in the discussion about the embodiments illustrated by terminal unit 10, computer 11a, replay device 11b and service sanction agent server 14 of FIGS. 1 and 2. Preferably, the service server, the host server and the terminal unit are implemented with microprocessor based computers and their attendant operating and data memories.

Service server 22 transmits to host server 23 a request signal that asks for key information that corresponds to the identity characters transmitted by the user from terminal unit 20. In response to reception of the request signal, host server 23 transmits the key information to the service server 22, and the key information is then transmitted to terminal unit 20. Service server 22 also transmits the key information to terminal unit 20 in response to the user's request.

Service server 22 generates a temporary validation key in response to the user's request, uses the key information to generate the user key, and generates the user authorization information from the temporary validation key encrypted by using the user's key and the hash value of the user's key. Service server 22 adds the digital information encrypted by the encryption algorithm to the header containing the user's authorization information in order to form the copyright protection protocol, and then transmits the copyright protection protocol to terminal unit 20.

The host server 23 generates the key information corresponding to the identity characters transmitted from service server 22 and stores the key information together with the identity characters, and then transmits the key information to service server 22 in response to the request signal generated by service server 22.

In the embodiments of FIGS. 1–4, service servers 12 and 22 may provide the user with a list or menu of digital information that is available from the information provider via service servers 12, 22. This enables the user to easily select the digital information that the user wants. For example, if the digital information is music, the content list may, for example, be the titles of songs or the names of the singers, artists or composers.

Figure 5:
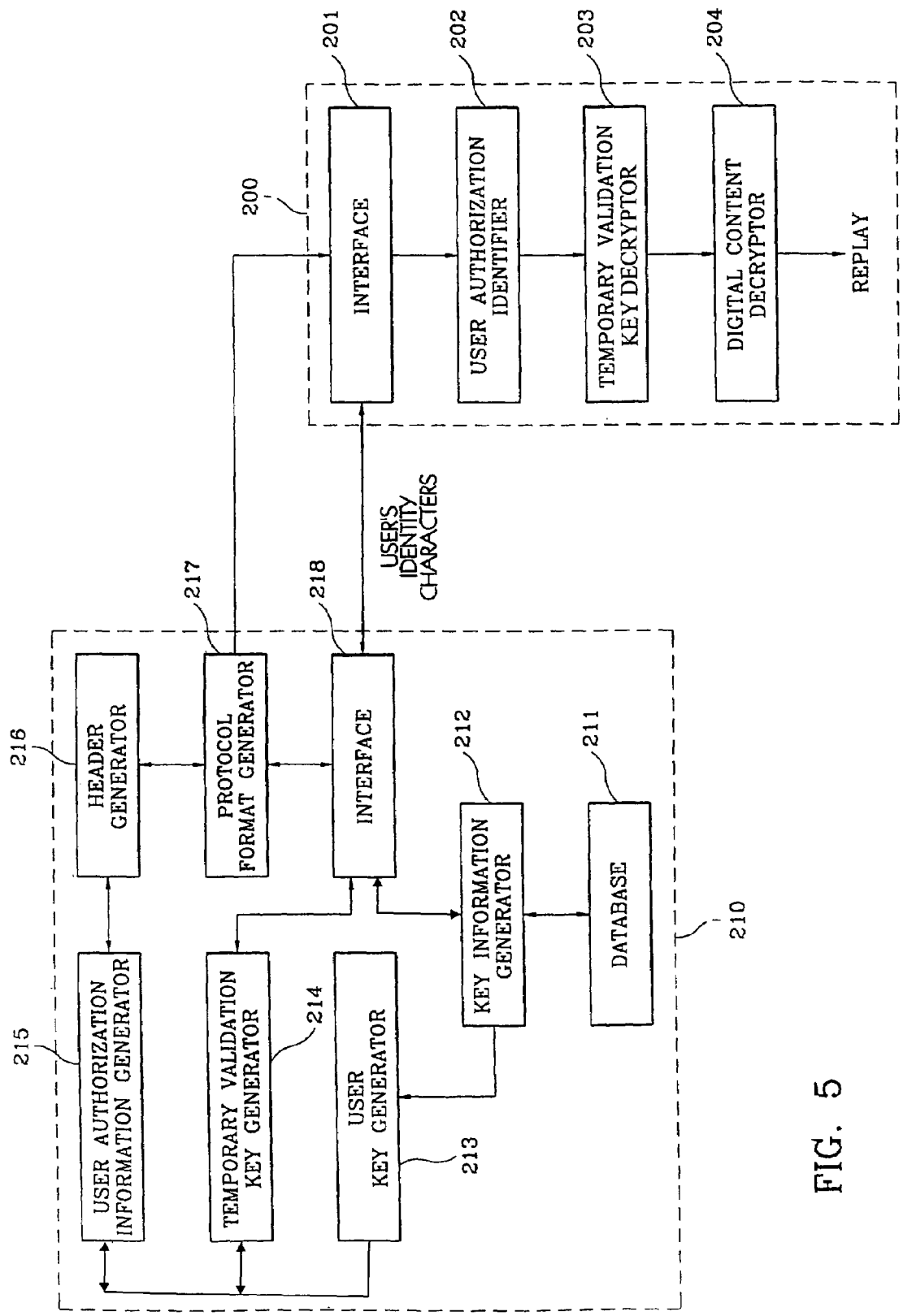
FIG. 5 is a schematic block diagram illustrating greater detail of the embodiment of a digital content encryption apparatus shown in FIG. 1.

FIG. 5 is a block diagram showing the detailed functional structure of the digital cryptograph of FIG. 1, with the functional structure of and the interrelation between a service server and a terminal unit being shown. Terminal unit 200 may be functionally constructed with an interface 201, a user authorization identifier 202, a temporary validation key decryptor 203, and a digital content decryptor 204.

The interface 201 receives the key information that has been generated by service server 210 in dependence upon the user's identity characters. User authorization identifier 202 obtains the user's key after reading the header of the copyright protection protocol received from service server 210, and then determines whether the user is authorized to receive digital information by analyzing the user's authorization information with the user's key that has been generated. Temporary validation key decryptor 203 decrypts the temporary validation key by using the user's key provided by user authorization identifier 202. Digital content decryptor 204 decrypts the encrypted digital information received with the copyright protection protocol by using the temporary validation key decrypted by temporary validation key decryptor 203.

Service server 210 may be constructed with an interface 218, database 211, key information generator 212, a user key generator 213, a temporary validation key generator 214, a user authorization information generator 215, a header generator 216, and a protocol format generator 217.

Interface 218 receives the identity characters received from terminal unit 200. Key information generator 212 determines whether the identity characters received by interface 218 exist among the sets of identity characters belonging to registered subscribers that are stored in database 211, and then generates the key information.

User key generator 213 generates the user's key by applying the key information to the key generation algorithm. The temporary validation key generator 214 generates the temporary validation key when the user accesses service server 210 through interface 218 and requests some item of digital information.

User authorization information generator 215 generates the user's authorization key information by encrypting the temporary validation key with the use of the user's key generated by user key generator 213 and then using the user's key and the encrypted temporary validation key.

Header generator 216 generates a header for the copyright protection protocol by using the user's authorization information and additional information necessary for encryption. Protocol format generator 217 generates the copyright protection protocol by adding the encrypted digital information to the header generated by header generator 216.

The operation of the digital content cryptograph that is functionally illustrated by FIG. 5 contemplates that when the user transmits his, or her, identity characters together with a request to receive digital information from service server 210, the identity characters are received by service server 210 through the interface 218 and applied to key information generator 212.

Key information generator 212 makes a determination of whether an identical set of identity characters exists among the identity characters of subscribers that are registered within the memory of database 211. Based upon the result of that determination, key information generator 212 either generates new key information that corresponds to the identity characters and applies that new key information to user key generator 213 or transmits to user key generator 213 the registered key information for the user that has been read from database 211.

User key generator 213 generates the user's key by applying the key information to the key generation algorithm, and then furnishes the user's key to user authorization information generator 215. Temporary validation key generator 214 generates the temporary validation key in response to the user access signal that is input through interface 218, and inputs the temporary validation key to user authorization information generator 215. User authorization information generator 215 determines, as, for example, by calculation, a hash value by applying the user's key to the hash algorithm, then encrypts the temporary validation key by using the user's key. Generator 215 generates the user's authorization information from a set of the hash value and the encrypted temporary validation key. The user's authorization information furnished by generator 215 is applied to header generator 216, which adds the user authorization information to the header and then provides the header to protocol format generator 217. Protocol format generator 217 forms the copyright protection protocol format by adding the encrypted digital information to the header and then transmits the copyright protection protocol to the user's terminal unit 200.

Figure 6:
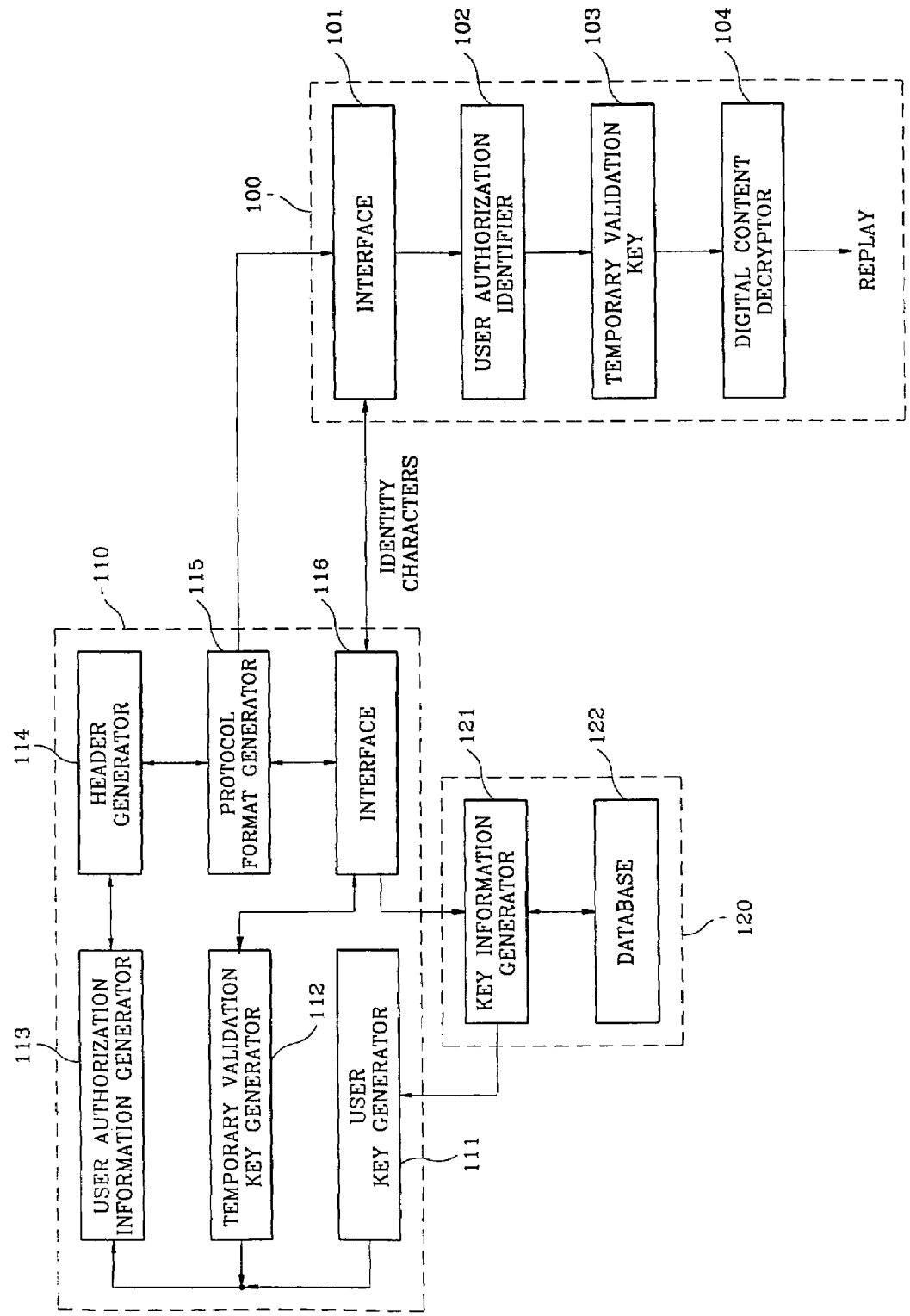
FIG. 6 is a schematic block diagram illustrating greater detail of the embodiment of a digital content encryption apparatus shown in FIG. 3.

FIG. 6 is a block diagram showing the detailed functional structure of the digital cryptograph of FIG. 3, with the functional structure of and the interrelation between service server 110, host server 120 and terminal unit 100 being schematically shown. Key information generator 121 and database 122 belong to host server 120. Also, user key generator 111, interface 116, temporary validation key generator 112, user authorization information generator 113, header generator 114, and protocol format generator 115 belong to service server 110. The functional operation of these components is the same as the like components described in the discussion about the embodiment represented by FIG. 5.

The illustration of the present invention in the foregoing paragraphs was made mostly by reference to the user of a personal computer. The principles discussed however, may be applied to any kind of device equipped with a communication program and a decryption algorithm.

Figure 7:
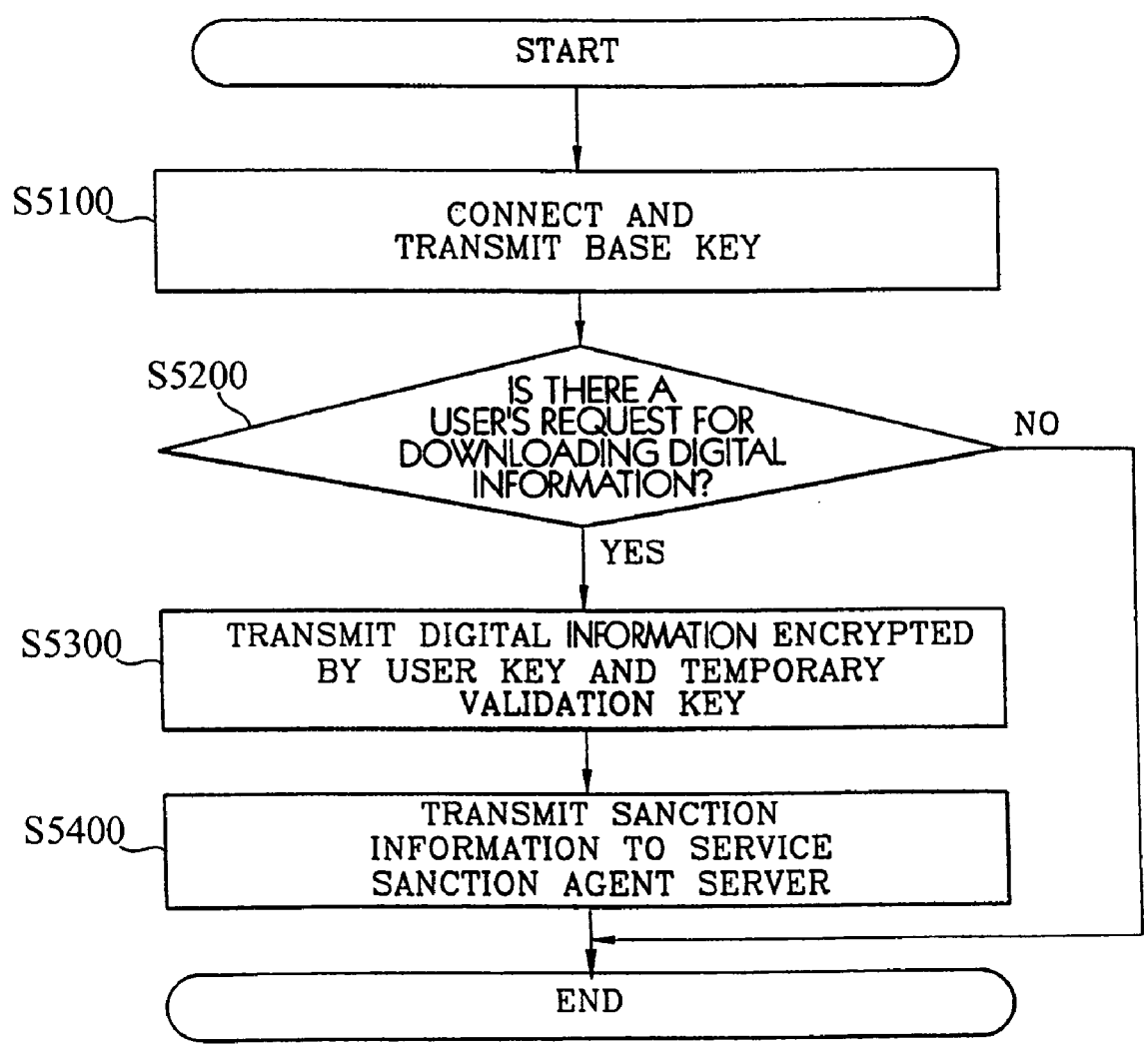
FIG. 7 is a flow chart illustrating the operation of a service server as applied to the embodiment shown in FIG. 3.

FIG. 7 is a flow chart illustrating the operation of the service servers and/or the host servers shown in FIGS. 1–6, when digital information is furnished to a user who was previously unregistered with the database of subscribers maintained by the service server or the host server. The service server can be accessed from the terminal unit with the network access program. When the user transmits his, or her, identity characters, the service server or the host server identifies whether that user is registered by comparing those identity characters with the identity characters of registered users that is maintained by the database. If this user is determined to be registered, no additional key information is generated by the key information generator.

If those identity characters are determined, however, to not exist in the database of the service server or the host server, however, the service server or the host server will recognize the user as a new member subscriber and proceed to implement a membership registration of this user. If this user completes the process of membership registration, the service server generates the key information or receives the key information from host server and then in step S5100 transmits the key information to the terminal unit in response to the user's request. This key information generated in response to the identity characters will be maintained valid unless the user requests the cancellation of his, or her, membership.

After step S5100, in step S5200 service server 22 determines whether the user's request signal for downloading the digital content has been received from terminal unit 20. If the request signal for downloading is determined in step S5200 to have been received, during step S5300 service server 22 generates the user's key by using the key information, encrypts the temporary validation key by using the user's key, and then creates the header by using the user's key and the encrypted temporary validation key. In step S5300, service server 22 also generates the copyright protection protocol by adding the encrypted digital content to the header and transmits the protocol to terminal unit 20 of the user. After transmitting the digital content to the user, during step S5400 service server 22 transmits the service fee information, for the cost incurred by the user in obtaining the digital information, to service sanction agent server 24 in order to add to the user's account the service fee information. Service sanction agent server 24 then charges the user for the digital content fee incurred by using the system to obtain the digital information that was transmitted to terminal unit 20.

Figure 8:
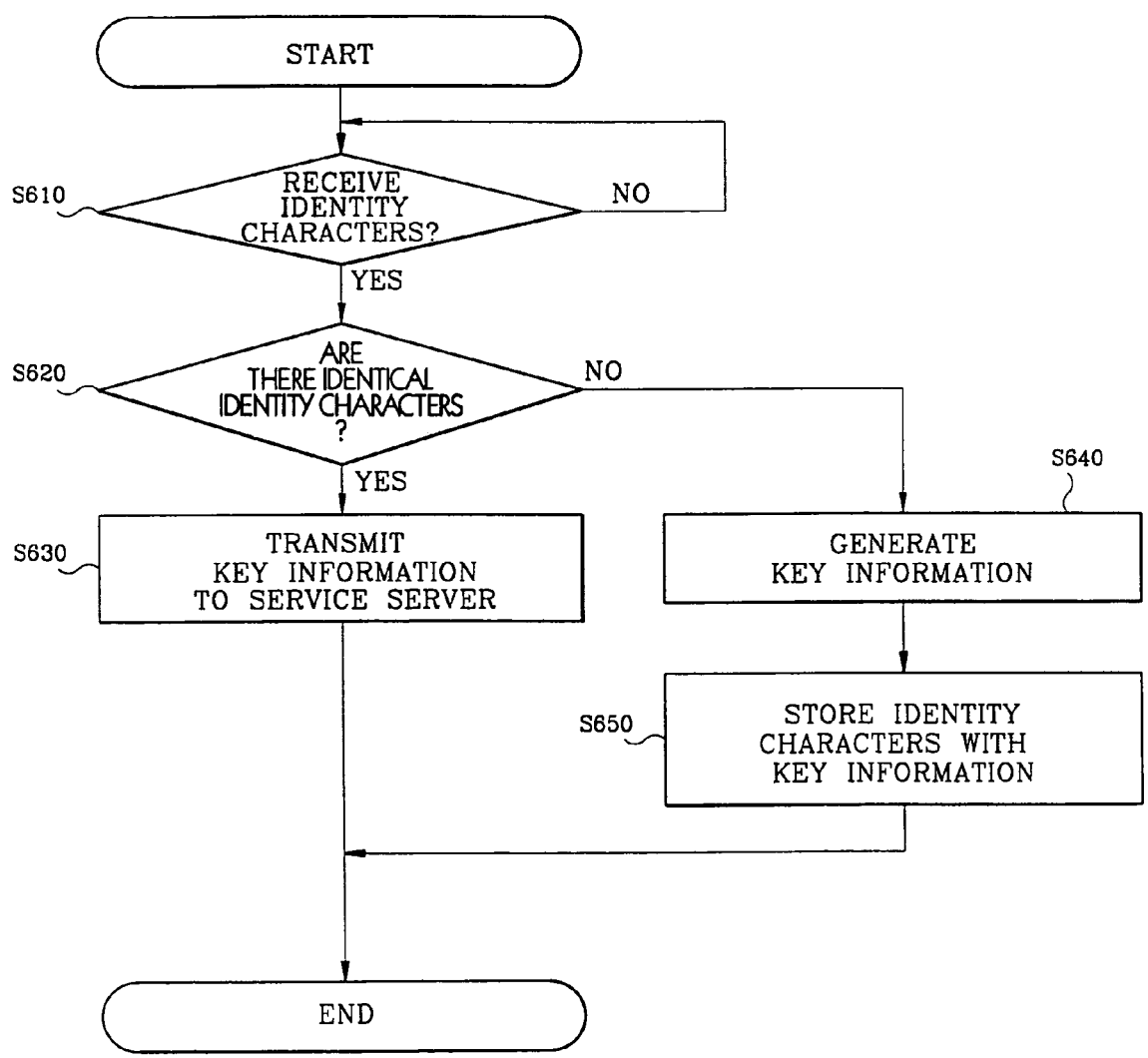
FIG. 8 is a flow chart illustrating the operation of a host server as applied to the embodiment shown in FIG. 3.

FIG. 8 is a flow chart illustrating the operation of the host server 23 shown by FIG. 3. In step S610, host server 23 determines whether the identity characters have been received from terminal unit 20. When host server 23 makes a determination that the identity characters have been received, in step S620, those identity characters are compared with the identity characters stored in the database of host server 23 in order to determine whether an identical set of identity characters exist within the database. After step of S620, if a determination has been made that an identical set of identity characters is already stored within the database, then during step S630 the corresponding key information stored with those identity characters is transmitted to service server 22. If a determination is made that no identical set of identity characters has previously been stored within the database, in step S640 the key information for the new user is generated and, in step S650, is stored with the identity characters of the new user.

Typically, step S5100 is performed by the service server 22 and steps of S610 through S650 are carried out by host server 23 when the cryptograph is configured with separate service server 22 and host server 23, as is shown in FIGS. 3 and 4. When, as is shown in FIGS. 1 and 2, only a single service sever 12 is provided, service server 12 integrally performs these steps in order to generate the key information corresponding to the user's identity characters and then transmits the key information that is generated to terminal unit 20 of the user; these steps are not specifically described since the processes can be easily inferred from FIGS. 7 and 8.

When provided with the key information together with the digital information requested by the user, terminal unit 10, 20 decrypts the key information and the digital information through the stored decryption algorithm and, at the same time, outputs the decrypted digital information to the either external or internal audio output devices (e.g., speakers or earphones) in order to render the decrypted digital information audible to the user. Therefore, when illegal copying of digital information from terminal unit 10, 20 to some other terminal unit occurs, the absence of the key information stored within that other terminal unit will disable the process and prevent the encrypted digital information from being replayed and heard.

When a registered user wants to provide another person with digital information obtained by the user from the service server 10, 20, the identification characters of that other person are stored with the identification characters of the registered user. In that situation, the encrypted digital information is decrypted and replayed with the former identification characters as well as with the identification characters of the other person. The fee incurred in exchange for the digital information provided would be paid by the user registered with service server 22.

In the functional sense, this digital content cryptograph serves as an encryption and decryption apparatus in the practice of the present invention; the cryptograph maybe divided broadly into a device encrypting digital information and a device decrypting the encrypted digital information.

Figure 9:
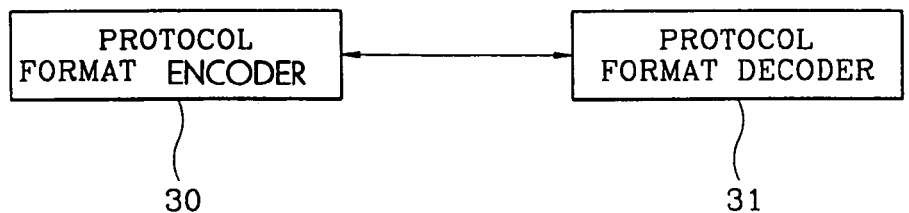
FIG. 9 is a schematic block diagram illustrating the operational relation between the protocol format encoder and protocol format decoder in accordance with the principles of the present invention.

FIG. 9 is a schematic block diagram showing the functional structure of the digital cryptograph functioning according to the principles of the present invention. The digital cryptograph of the present invention may be summarized as protocol format encoder 30 operationally connected to protocol format decoder 31. Protocol format encoder 30 generates the copyright protection protocol format containing the encrypted digital information, together with a header including the information necessary for encrypting and decrypting the digital information. Protocol format decoder 31 decrypts and replays the encrypted digital information received in the copyright protection protocol format from protocol format encoder 31, in accordance with the header information from the protection protocol format.

More specifically, protocol format encoder 30 generates the user's key by using the key information generated in correspondence with the user's identity characters and the key generation algorithm. Then, protocol format encoder 30 generates the header to which the user's authorization information with the encrypted temporary validation key is added by using the user's key and a hash value of the user key. Protocol format encoder 30 also generates the copyright protection protocol format by adding the digital information that has been encrypted with the temporary validation key to the header.

Protocol format decoder 31 receives the copyright protection protocol format transmitted by protocol format encoder 30, generates the user key by using the key information, and decrypts the encrypted digital content by using the temporary validation key after decrypting the temporary validation key by using the user's key when protocol format encoder 30 has identified the user of the terminal unit to be authorized. Indication of whether the user is authorized, as a subscriber registered with the database maintained by the service server, or the host server, is provided by the user's authorization information obtained by protocol format decoder by employing the user's key to determine whether the user is authorized to receive, decode and use the digital information.

Operation of the protocol format processing system will be described in detail by now turning to FIGS. 10 through 16. When the user selects the digital information that he, or she, wants to obtain, the digital cryptograph of the present invention arranges the digital information into the protocol format described in greater detail in the following paragraphs, and then transmits the protocol format to the terminal unit of the user.

Figure 10:
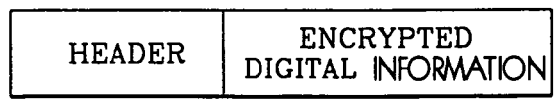
FIG. 10 is an illustration of a protocol format as may be applied to the practice of the present invention.

FIG. 10 is an illustration of one protocol format as applied to the practice of the present invention. The format of one protocol for protecting the copyright of digital information to be transmitted by a service server, may be arranged with a header that includes information for encrypting the digital information and material that explains the digital information, and an encrypted digital information field. Referring additionally now to FIG. 5, to understand the structure of the header recall that the digital information requested by the user is encrypted partly by the user key and the temporary validation key so as to prevent replay of the digital information in the absence of the key information, such as when the encrypted digital information is obtained by another entity.

Figure 11:
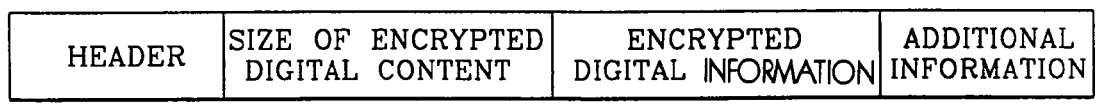
FIG. 11 is an illustration of another embodiment of a protocol format as maybe applied to the practice of the present invention.

FIG. 11 illustrates another embodiment for the protocol format, alternative to that shown by FIG. 10, with the copyright protection protocol including additional fields that maybe optionally added. A field for indicating the size of the encrypted digital content may is inserted between the header and the encrypted digital information field; preferably the size of the encrypted digital content is the same as the size of the unencrypted digital content field. Also, an additional information field may be added to the rear end of the encrypted digital information field in order to define the encrypted digital information for the convenience and easy understanding by the user. If the digital information is, for example, a musical song, the additional information could be various related information such as the name of the singer, title of the song, the playing time, the title of album, the publisher of album, the publication date of the song, and if the digital information is a musical video, the additional information could include the name of the associated motion picture.

The additional information field may be arranged in a sequence with the header and the data being arranged in turn, so the format may be expanded regardless of the number of additional items of digital information included within the copyright protection protocol.

Figure 12:
FIG. 12 is an illustration of a header field that may be applied to the protocol formats shown in FIG. 10 and in FIG. 11.

FIG. 12 illustrates the header field suitable for FIGS. 10 and 11 more specifically, with a copyright support information field, an unencrypted header field and an encrypted header field. The copyright support information field includes a copyright support code that shows whether the digital information provided by the digital content provider supports the copyright. If the copyright support code exists in the copyright support information field, the digital information being provided to the user is recognized as being eligible to be encrypted, and then decrypted by the user for replay. Otherwise, if the copyright support code is absent from the copyright support information field, the digital information is identified as not being eligible to be unencrypted (e.g., due to the unregistered status of the recipient of the digital information) and the decryption process is terminated in order that the digital information can only be replayed without decryption (i.e., replayed in its encrypted state as noise).

FIG. 13 illustrates another embodiment of a header field alternative to that of FIG. 12. The header field of FIG. 13 corresponds to the optionally added fields of the protocol format illustrated by FIG. 11. An offset field and a field for indicating the size of the unencrypted header may be inserted between the copyright support information field and the unencrypted header field. The offset field provides information about the position of the additional information field; this enables the additional information field to be accessed without analysis of the header. Also, a field for indicating the size of the encrypted header is provided in the sequence prior to the encrypted header field.

FIG. 14 illustrates the format of an unencrypted header field suitable for the header fields of the alternatives shown by FIGS. 12 and 13. The unencrypted header field may be arranged with a copyright library version field, a digital conversion format field for indicating the type of the digital conversion format, a key generation algorithm field for indicating the information on the key generation algorithm, a digital content encryption algorithm field for indicating the information on the digital content encryption algorithm, a field for indicating the user's authorization information at the computer of the user's terminal unit, and a field for indicating the user's authorization information at the replay device. The digital conversion format field shows which conversion technique was used to convert the digital content into the digital signal. Typical examples of the conversion method are MP3 and AAC. The encryption algorithm field may include a hash algorithm code, key encryption algorithm code, the size of initial vector (IV), and information on initial vector used for encrypting the digital content. The field for indicating the user's authorization information at the computer of the user's terminal unit and the field for indicating the user's authorization information at the replay device are the most important components of the header; they serve to identify the user's authorization to use the digital information and increase in proportion to the number of people who share the encrypted digital information.

FIG. 15, illustrates another embodiment of the unencrypted header field that is alternative to that shown by FIG. 14. This unencrypted header field may optionally include added additional fields, such as an identifier of the information provider and the number of users who are sharing the digital information. The field for indicating the code of information provider may be inserted between the digital content conversion format field and the key generation algorithm field. To the rear end of the digital content encryption algorithm field maybe added a field indicating the number of users sharing the computer at the terminal unit, and a field indicating the number of users sharing the replay device.

FIG. 16 illustrates the detailed structure of the user authorization information fields suitable for the unencrypted header fields shown in FIGS. 14 and 15. The user authorization information fields at the computer of the terminal unit as well as at the replay device, may be arranged with a first field that indicates the size of hash value generated by the hash algorithm, a second field that indicates a hash value for the user's key, a third field that indicates the size of the resultant value of the encrypted temporary validation key created by the key encryption algorithm, and a fourth field that indicates the resultant value of the encrypted temporary validation key.

FIG. 17 illustrates the details of an arrangement of an encrypted header that is suitable use in the header field shown by FIGS. 12 and 13. The encrypted header field may be arranged with a first field that indicates the basic process unit of the digital content of the information to be furnished to the user, a second field that indicates the number of encrypted bytes, a second field that states the encrypted frame unit, and a third, or hash value field, that establishes the state of the entire header. The basic process unit of the digital information and the number of the encrypted bytes of resulting from encryption of the digital information may be assigned by the information provider; however, the basic process unit and the number of encrypted bytes are likely to be set to basic values by a basic algorithm by reference to the processing speed of the terminal unit and a memory that stores data for the microprocessor based terminal unit. The hash value in the hash value field indicates the hash value of both the copyright support information field and the unencrypted header field; that is, the hash value for the fields arranged within the header field prior to the encrypted header field.

Figure 18:
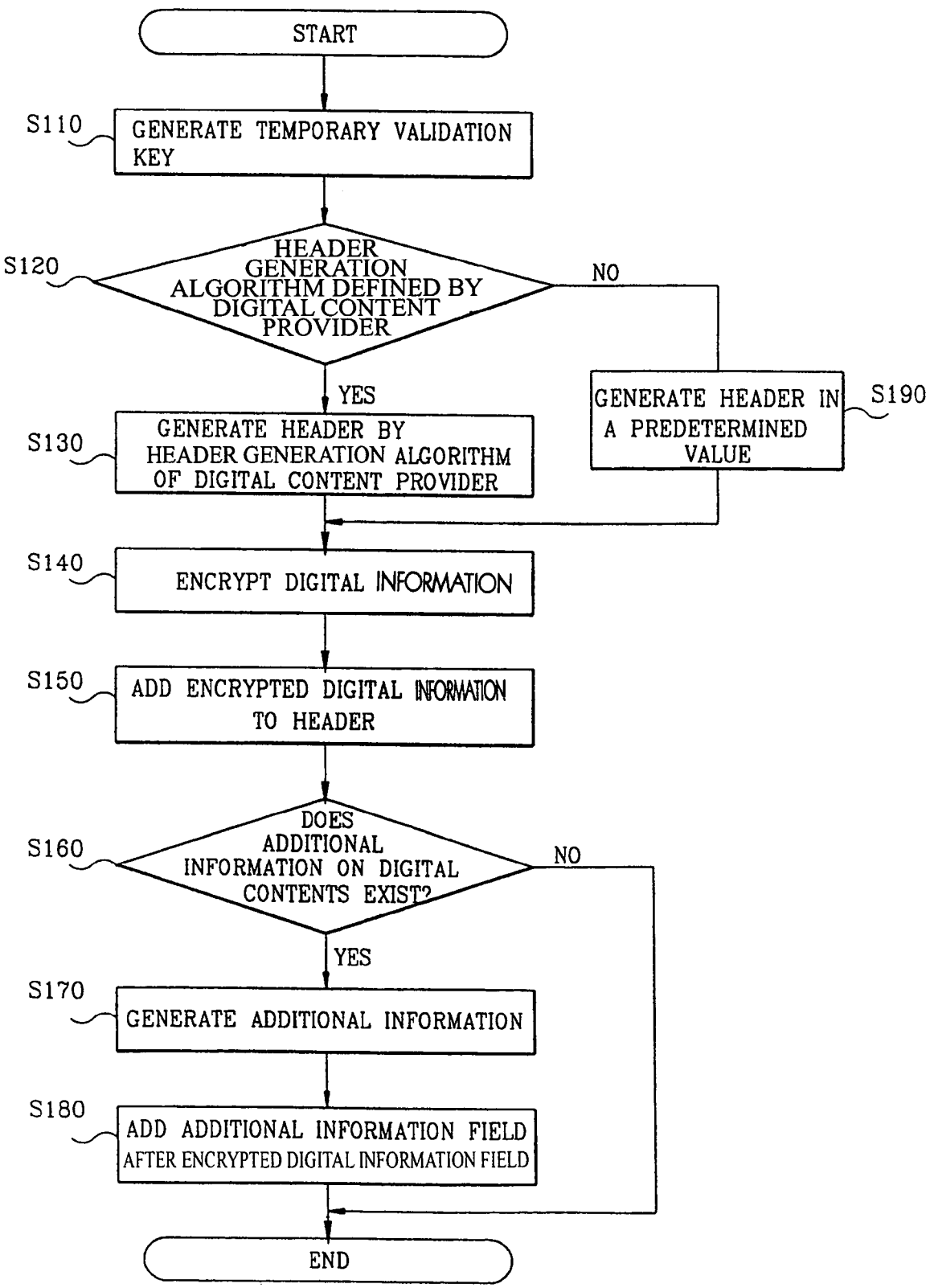
FIG. 18 illustrates a flow chart for one process of generating a protocol in the practice of the present invention.

FIG. 18 is a flow chart illustrating one method for generating a protection protocol during the practice of the present invention. When the digital content request signal is received from the user, the temporary validation key is generated in step S110. Then, determination is made of whether the header generation algorithm defined by the digital content provider exists when the temporary validation key is generated in step S120. If the header generation algorithm is determined during step S120 to be available to the service server, then in step S130 the header is generated with the header generation algorithm defined by the digital content provider. If the determination establishes that the header generation algorithm is unavailable to the service server, the header is created in step S190 with a basic value.

After the header is created at either step S130 or S190, the digital information requested by the user is encrypted during step S140 and the encrypted digital information is then added during step S150 to the header generated during either step S130 or S190. When additional information is to be provided to the user, a determination is made in step S160 of whether the additional information about the digital information combined with the header exists. If, during step S160 the additional information is determined to exist, the additional information field is generated during step S170 and during step S180, added to the rear end of the encrypted digital information field in order to form the copyright protection protocol. The copyright protection protocol is then transmitted to the user who earlier made the request for the digital information. The additional information is optionally added to the digital information by the information provider when the provider would like to make some additional explanation about the digital content to the user. The additional information processing steps may be added selectively by the service provider.

Figure 19:
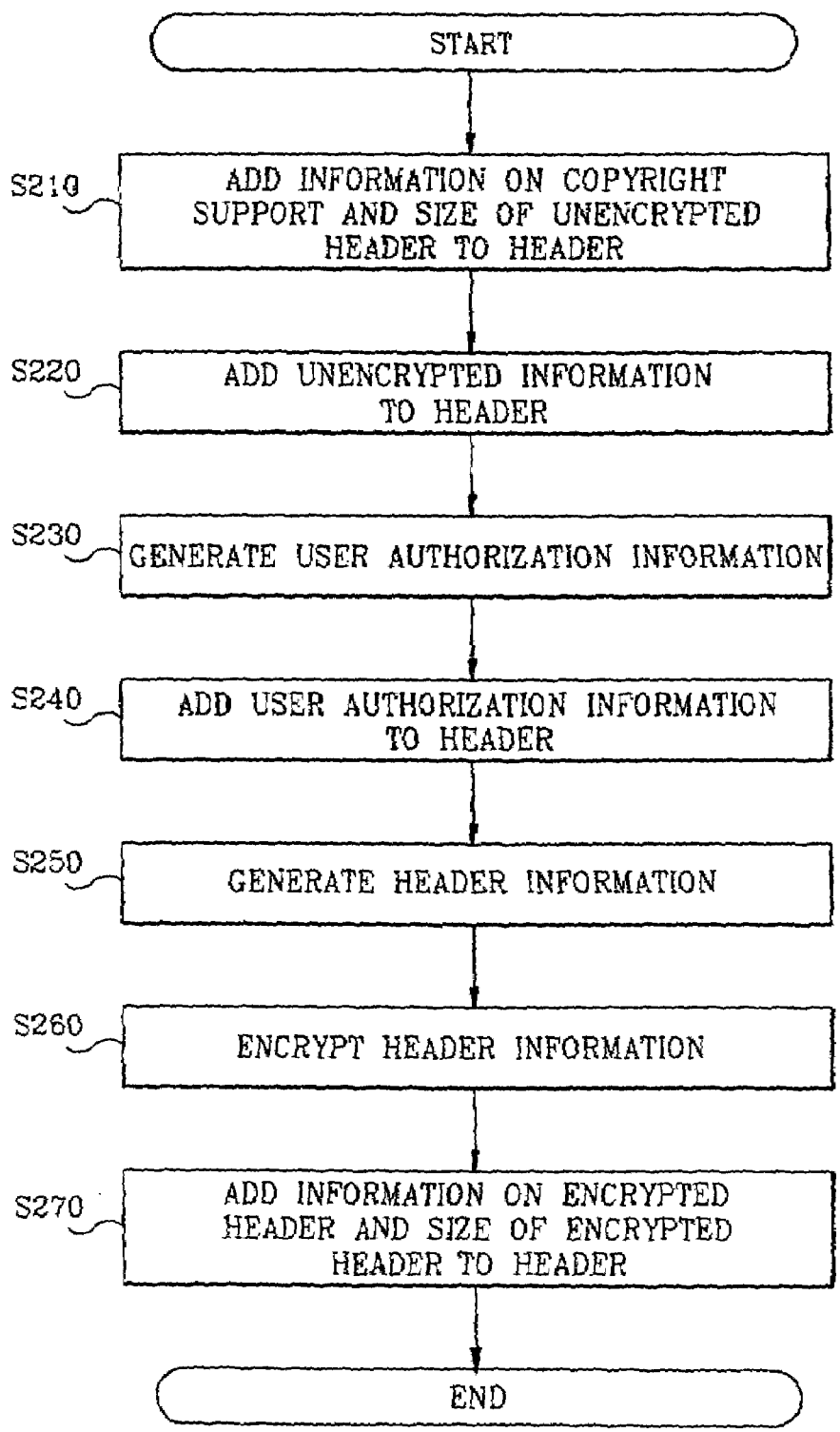
FIG. 19 illustrates a flow chart for one process of generating a header in the process shown by FIG. 18.

FIG. 19 is a flow chart illustrating the method of generating the header applied to FIG. 18.

A copyright support information field, describing whether the digital content provided is under the protection of copyright, and a field for indicating the size of unencrypted header are generated and added to the header (S210). An unencrypted header field is also generated and added to the header (S220), which field includes the version information, a type of music, the code of service provider supporting the copyright, hash algorithm, key generation algorithm, and digital content encryption algorithm.

If the additional information field of the digital content exists, information on the starting point of the additional information field can be also added to the header.

At the step of S220 that a part of the header part is constructed, the user authorization information is generated using the key information the user has and the generated user authorization information is added to the header (S240). Following the step of S240, the encrypted header information is generated (S250).

The header information includes information necessary for encryption of the digital content such as size of the encrypted block, encryption period and encrypted frame unit, etc. The header information is also generated to include the hash value by applying the whole header to the hash algorithm, with which value the change of header information can be determined.

The header information generated at the step of S250 is encrypted (S260) and then the information on the encrypted header and the size of the encrypted header is added to the header (S270), so that generated is the header added to the front end of the encrypted digital content transmitted to the user.

In case the encryption algorithm provided by the digital content provider exists (S260), the header information is encrypted by the encryption algorithm and the temporary validation key. Otherwise the header information is encrypted by the basic algorithm and the temporary validation key.

Figure 20:
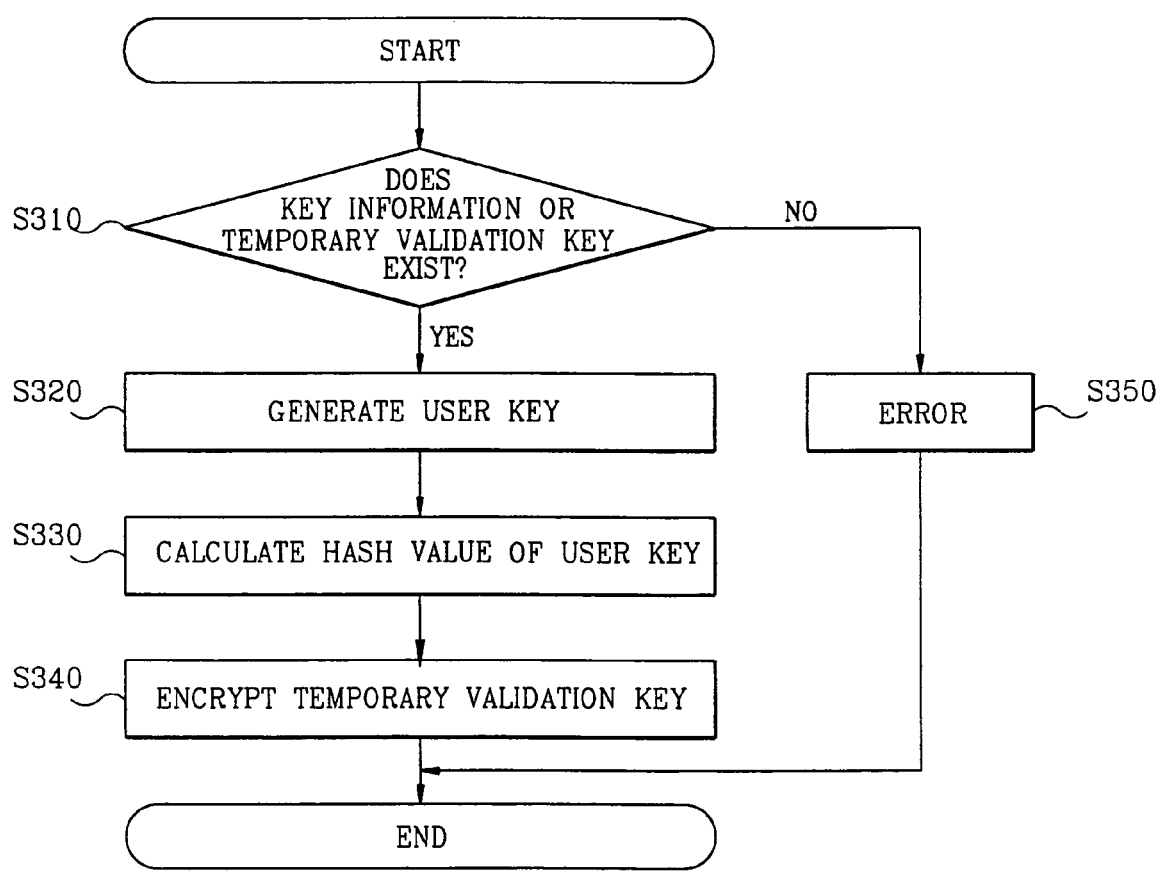
FIG. 20 illustrates a flow chart for one process of generating user authorization information in the process shown by FIG. 19.

FIG. 20 is a flow chart illustrating the method of generating the user authorization information applied to FIG. 19, which describe in more detail the method of generating the encryption key information at the step of S230 of FIG. 19.

It is determined whether the key information or the temporary validation key exists (S310). The user key is generated by applying the key information to the key generation algorithm when it is determined that the key information and the temporary validation key exist at the step of S310 (S320).

A hash value is calculated by applying the user key generated at the step of S320 (S330) to hash algorithm, and then the temporary validation key is encrypted using the key encryption algorithm and the generated user key (S340). At the NO determination of step S310, the process is terminated (S350) with output of message of error when the key information or the temporary validation key is determined not to exist.

Figure 21A:
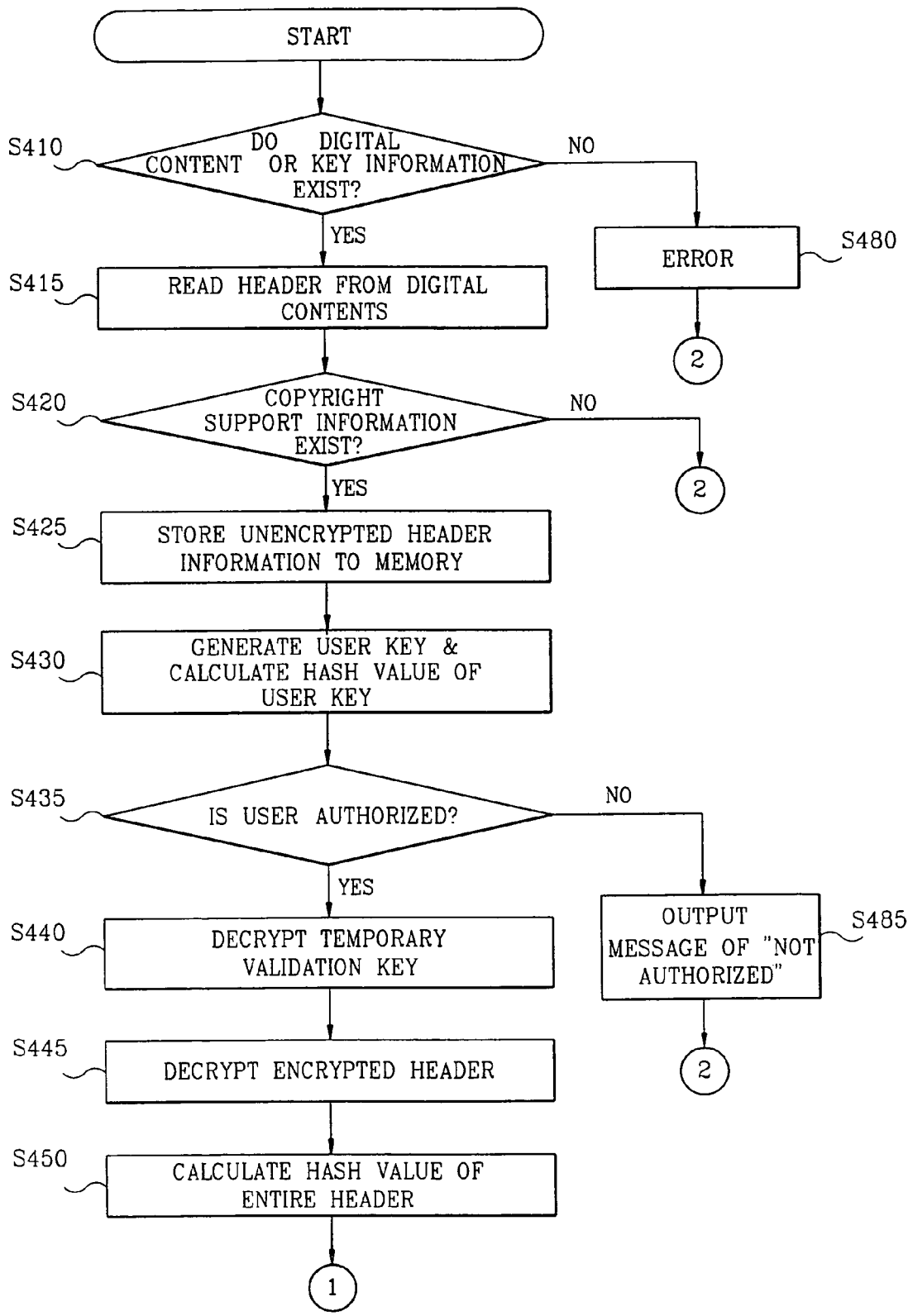
FIGS. 21A and 21B illustrate a flow chart for one process of decrypting and playing digital information in the practice of the present invention.
Figure 21B:
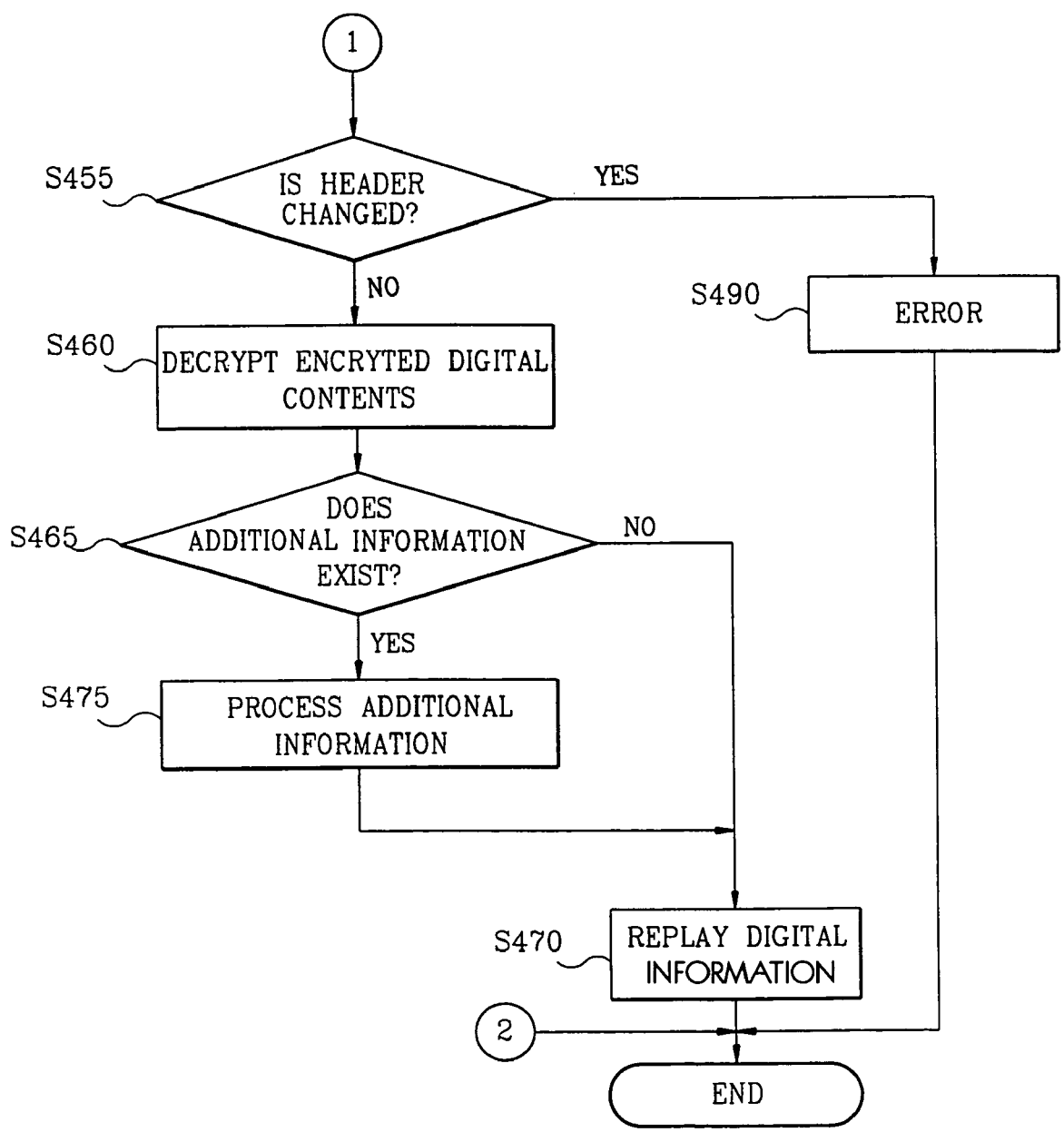

FIGS. 21A–21B provide a flow chart illustrating the method of decrypting and replaying the encrypted digital content according to the present invention.

First, it is determined whether the key information or the digital content received from the digital content provider exists (S410). The header of the digital content is read when either the digital content or the key information is determined to exist (S415), and the process is recognized to be an error and terminated when the digital content and the key information do not exist (S480).

It is determined whether the header read at the step of S415 includes the copyright support code, that is to say, whether the digital content supports the copyright (S420).

If the copyright support code is determined to exist, the digital content are recognized to be protected by copyright and the read unencrypted header information is stored at a memory as a predetermined variable (S425).

If the copyright support code is determined not to exist, that is, the digital content are not protected by copyright, the digital content is recognized to be an error in the decryption process. Then the decryption process is no longer carried out and the received digital content are decoded and output, not passing through decryption process.

When the digital content is determined to be supported by copyright, the user key is generated using the key information and then the hash value of the generated user key is calculated (S430).

It is determined whether the calculated hash value of the user key is identical with a hash value of the user key in the header (S435).

When the calculated hash value of the user key is determined to coincide with the hash value of the user key in the header, the user is recognized to be authorized and the temporary validation key is decrypted using the user key (S440). The encrypted header is decrypted using the decrypted temporary validation key (S445). The hash value of the entire header, which is served as a reference value for determination the change of the entire header, is calculated by applying the entire header to a hash algorithm (S450).

At the NO determination of step S435, a message such as "Not authorized" is output (S485) and the entire digital content decryption process is terminated when the calculated hash value of the user key is determined not to be identical with the hash value of the user key in the header.

The change of the header is determined according to the hash value of the entire header (S455). In case the header is determined not to be changed, the encrypted digital content are decrypted (S460).

It is then determined whether additional information exists (S465). The digital content are replayed if the additional information is determined not to exist (S470). The additional information is processed (S475) and then replayed (S470) when the additional information is determined to exist.

When the header is determined to be changed at the step of S455, the user is recognized not to be authorized so that the decryption process is terminated for the user not to replay the digital content (S490).

Figure 22:
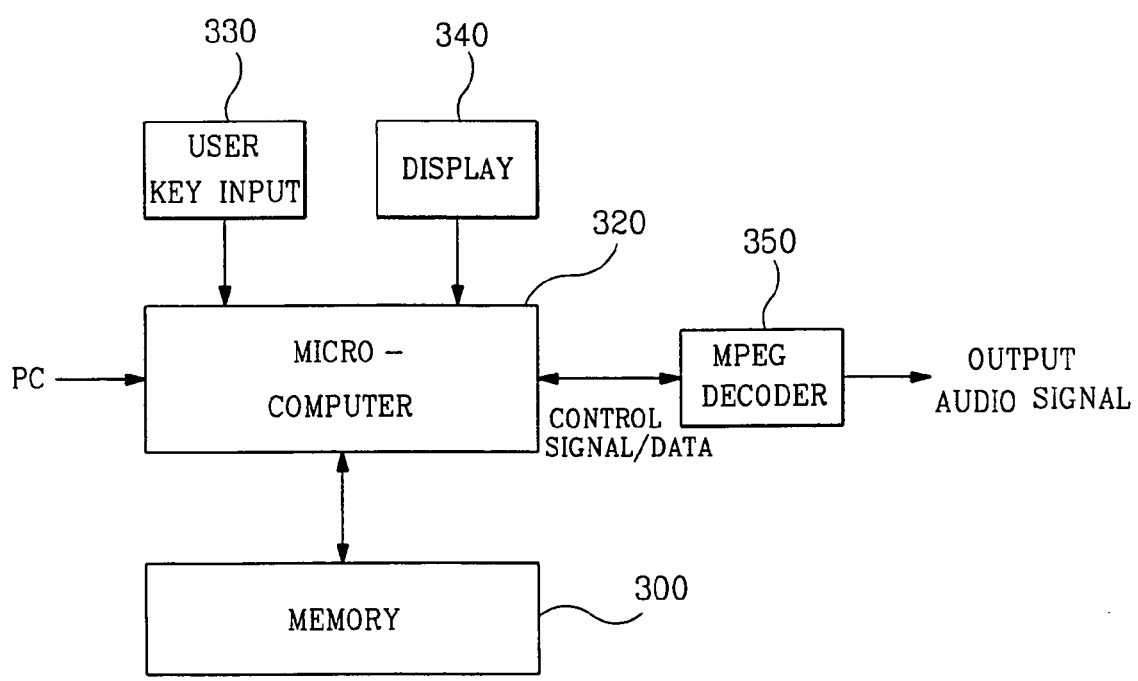
FIG. 22 is a schematic block diagram illustrating one embodiment of a player suitable for broadcasting digital information transmitted by the embodiments shown by FIGS. 1 and 3.

FIG. 22 illustrates schematically the structure of the replaying device applied to FIGS. 1–4.

Memory 300 includes a driving algorithm for the entire system and a plurality of algorithms for decrypting the encrypted digital content. Memory 300 stores in itself the received key information and digital content data in response to the writing signal and outputs the stored key information and digital content data in response to the reading signal. Memory 300 is preferred to be a flash memory.

Microcomputer 320 receives the key information and digital content data to store in memory 300, decrypts the encrypted digital content by the algorithm stored in memory 300 and then outputs them according to the key signal input from the user key input device 330. At the same time, it controls display 340 to display the present state of the apparatus.

Microcomputer 320 generates the user key through the user authorization information of the header using the key information stored in memory 300 according to the algorithm, which is also stored in memory 300, when the input digital content are encrypted. Also, microcomputer 320 decrypts the temporary validation key included in the user authorization information of the header using the generated user key. The encrypted digital content are decrypted using the decrypted temporary validation key to be output.

When the unencrypted digital content are received, microcomputer 320 replays and outputs the digital content without decrypting them. Decoder 350 decodes the digital content output from microcomputer 320 to output an audio signal. Decoder 350 is preferred to be an MPEG decoder.

Figure 23A:
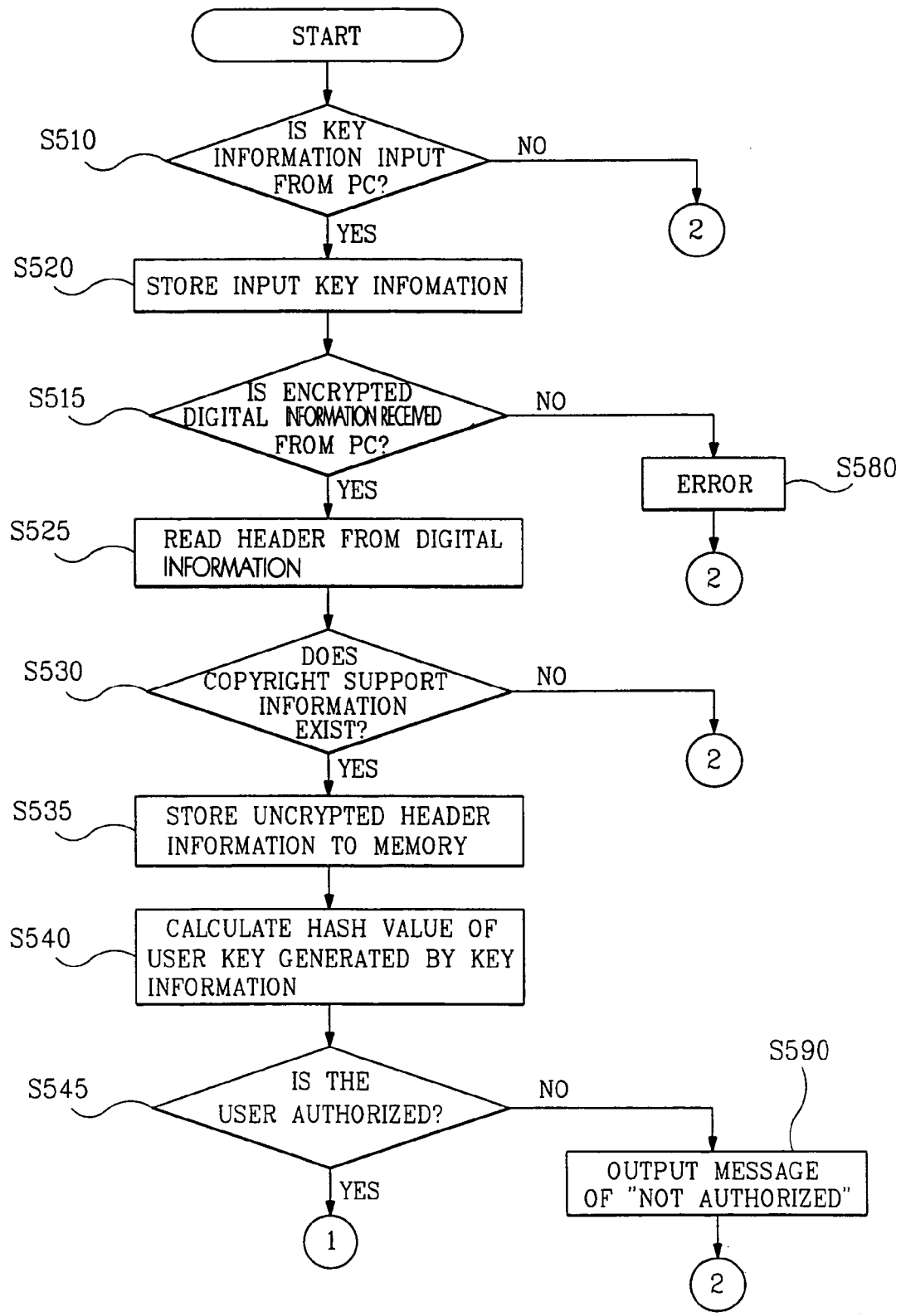
FIGS. 23A and 23B illustrate a flow chart for another process of decrypting digital information in the practice of the present invention.
Figure 23B:
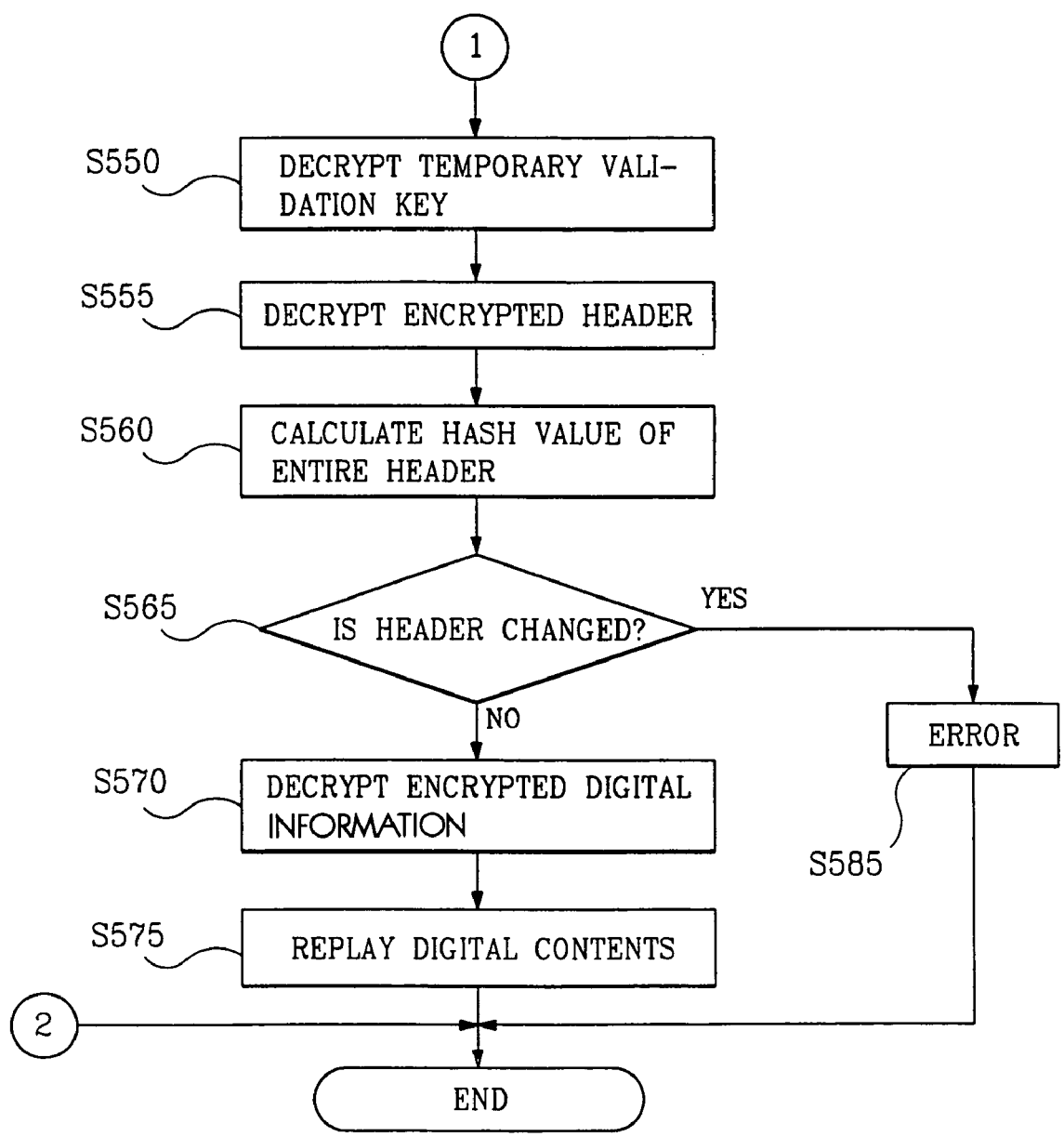

FIGS. 23A–23B provide a flow chart illustrating the method of decrypting the encrypted digital content when the encrypted digital content are input from the PC to the replaying device constructed as in FIG. 22. Microcomputer 320 determines whether the key information is input from the PC (S510) and stores the input key information in memory 300 when the key information is determined to be input (S515).

After storing the key information in memory 300, microcomputer 320 determines whether the encrypted digital content are input from the PC (S520). When the encrypted digital content are determined to be input at the step of S520, microcomputer 320 stores the digital content in memory 300 and then reads the header from the digital content according to the decryption algorithm stored in memory 300 after the transmission process is completed (S525). When the encrypted digital content are determined not to be input, they are recognized as an error (S580) and the decryption process is terminated.

Next, microcomputer 320 determines whether the copyright support code exists in the header of the read digital content (S530). If the copyright support code is determined to exist, the digital content are recognized to be protected by copyright and the read unencrypted header information is stored at memory 300 as a predetermined variable (S535). When the digital content is determined to be protected by copyright, microcomputer 320 generates the user key using the key information and the key generation algorithm. Microcomputer 320 calculates a hash value of the generated user key by hash algorithm stored in memory 300 (S540).

Next, microcomputer 320 determines whether the calculated hash value of the user key is identical with a hash value of the user key in the user authorization information of the header (S545). When the calculated hash value of the user key is determined to coincide with the hash value of the user key in the header, the user is recognized to be authorized and the temporary validation key is decrypted using the user key (S550). The encrypted header is decrypted using the decrypted temporary validation key (S555).

At the NO determination of step S545, a message of "Not authorized" is output (S590) and the decryption process is terminated when the calculated hash value of the user key is determined not to be identical with the hash value of the user key in the header.

A determination is made in accordance with the hash value of the entire header whether the entire header is changed in order to determine whether the user is authorized to decrypt and replay the digital content. The hash value is calculated by applying the entire header to hash algorithm (S560).

The change of the entire header is determined according to whether the hash value of the entire header calculated at the step of S560 is identical with a hash value of the entire header stored in the header (S565).

When the header is determined not to be changed, that is, the hash value of the entire header calculated at the step of S560 is identical with the hash value of the entire header stored in the header, the encrypted digital content are decrypted (S570) and then replayed (S575).

When the header is determined to be changed at the step of S565, that is, the calculated hash value of the entire header is not identical with the hash value of the entire header stored in the header, the user is recognized not to be authorized so that the decryption process is terminated for the user not to replay the digital content (S585).

In the present invention, the supplied encrypted digital information may not be replayed without the use of the decoding algorithm and the key information. Therefore, when the digital information is illegally copied, it may not be replayed. This discourages illegal copying, distribution, publication and unauthorized distribution, and minimizes the risk of significant loses for the information provider of the digital information that may be caused by illegal copying and unauthorized distribution. Moreover, this systems encourages the user to acquire the digital information via a legitimate route.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for encoding a protocol for a service server used to transmit digital information while preserving transmission security in a transmission system having a terminal unit for conditionally accessing the digital information, comprising a protocol format generator for generating a copyright protection protocol by generating key information using random numbers and applying the key information to a key generating algorithm to generate a user key, said key information corresponding to identity characters of a user, said user key utilized to generate a temporary validation key for encrypting the digital information, said copyright protection protocol comprising a header including the encrypted digital information and user authorization information, and said temporary validation key being encrypted to generate the user authorization information.

2. An apparatus for decoding a protocol for a terminal unit used to receive digital information while preserving transmission security in a transmission system having a service server including a protocol format generator for generating a copyright protection protocol by utilizing key information corresponding to identity characters of a user, said copyright protection protocol including encrypted digital information and a header having user authorization information including a temporary validation key for decrypting the encrypted digital information, the apparatus comprising a protocol format decoder for receiving the key information and the copyright protection protocol, generating a user key using the key information, analyzing the user authorization information with respect to the user key to determine whether the user is authorized to receive the encrypted digital information, utilizing the user key to decrypt the temporary validation key where the user is authorized, and decrypting the encrypted digital information using the decrypted temporary validation key.

3. An apparatus for providing key information corresponding to identity characters of a user in a transmission system having a service server for encrypting digital information using the key information, and outputting the key information and the encrypted digital information for conditional accessing by a terminal unit, comprising:
   a database for storing a plurality of identity characters of users and corresponding key information; and
   a key information generator for determining whether the identity characters of the user is stored in the database, said key information generator generating the key information in response to the database not including the identity characters of the user, and/or producing the key information from the database in response to the database including the identity characters of the user.

4. The apparatus according to claim 3, wherein the key information generator stores the generated key information and the corresponding identity characters of the user in the database.

* * * * *